(12) United States Patent
Buvat et al.

(10) Patent No.: US 9,548,508 B2
(45) Date of Patent: Jan. 17, 2017

(54) SPECIFIC PHOSPHONATED COPOLYMERS AND INORGANIC PARTICLES GRAFTED BY SAID COPOLYMERS

(75) Inventors: Pierrick Buvat, Montbazon (FR); Thomas Boucheteau, Malakoff (FR); Ghislain David, Montpellier (FR); François Ganachaud, Decines (FR); Sergei Victorovich Kostjuk, Minsk (BY)

(73) Assignees: Commissariat a l'energie atomique et aux energies alternatives, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 532 days.

(21) Appl. No.: 14/009,674

(22) PCT Filed: Apr. 10, 2012

(86) PCT No.: PCT/EP2012/056447
§ 371 (c)(1),
(2), (4) Date: Jan. 14, 2014

(87) PCT Pub. No.: WO2012/140011
PCT Pub. Date: Oct. 18, 2012

(65) Prior Publication Data
US 2014/0113215 A1    Apr. 24, 2014

(30) Foreign Application Priority Data
Apr. 12, 2011 (FR) .................. 11 53187

(51) Int. Cl.
*H01M 8/1011* (2016.01)
*H01M 8/1018* (2016.01)
(Continued)

(52) U.S. Cl.
CPC .......... *H01M 8/1037* (2013.01); *C08G 77/395* (2013.01); *C09C 1/3081* (2013.01);
(Continued)

(58) Field of Classification Search
CPC ..................................................... H01M 8/10
See application file for complete search history.

(56) References Cited

U.S. PATENT DOCUMENTS

2005/0112439 A1* 5/2005 MacKinnon ........ H01M 8/0291
                                                                    429/483
2007/0049718 A1   3/2007 Schafer et al.
(Continued)

FOREIGN PATENT DOCUMENTS

CN      101 792 470      8/2010

OTHER PUBLICATIONS

Gallagher, S. "Synthesis and Characterization of Phosphonate-Containing Polysiloxanes", Journal of Polymer Science Part A. Polymer Chemistry, vol. 41, No. 1, pp. 48-59, (Jan. 2003), XP055001422.
(Continued)

*Primary Examiner* — Barbara Gilliam
*Assistant Examiner* — Nathanael Zemui
(74) *Attorney, Agent, or Firm* — Oblon, McClelland, Maier & Neustadt, L.L.P.

(57) ABSTRACT

The invention relates to copolymers comprising a chain of siloxane repeat units of at least two different types, a first type of siloxane repeat unit comprising at least one —OH group on the silicon atom of the siloxane repeat unit and a second type of repeat unit comprising at least one pendant chain on the silicon atom of said repeat unit, this pendant chain consisting of a polymer chain comprising a chain of repeat units carrying at least one group of formula
(Continued)

—$PO_3R^1R^2$ wherein $R^1$ and $R^2$ independently represent a hydrogen atom, an alkyl group or a cation.

24 Claims, 2 Drawing Sheets

(51) Int. Cl.
*H01M 8/10* (2016.01)
*C08G 77/395* (2006.01)
*C09C 1/30* (2006.01)
*C09C 3/12* (2006.01)
*C08G 77/12* (2006.01)

(52) U.S. Cl.
CPC ............. *C09C 3/12* (2013.01); *H01M 8/1051* (2013.01); *C08G 77/12* (2013.01); *H01M 8/1011* (2013.01); *H01M 2008/1095* (2013.01); *Y02E 60/521* (2013.01)

(56) References Cited

U.S. PATENT DOCUMENTS

| | | | |
|---|---|---|---|
| 2009/0048395 A1 | 2/2009 | Mohwald et al. | |
| 2011/0065863 A1* | 3/2011 | Fitremann | A61K 8/898 525/54.2 |
| 2012/0225958 A1* | 9/2012 | Wang | C08J 5/2256 521/27 |

OTHER PUBLICATIONS

International Search Report Issued May 16, 2012 in PCT/EP12/056447 Filed Apr. 10, 2012.

* cited by examiner

SPECIFIC PHOSPHONATED COPOLYMERS AND INORGANIC PARTICLES GRAFTED BY SAID COPOLYMERS

TECHNICAL FIELD

The present invention pertains to specific copolymers intended to be grafted onto the surface of inorganic particles.

These particles, once the hydrolysis of some groups of said copolymers has been performed if so required, have the characteristic of exhibiting an ion exchange capability which can be modulated and is particularly high.

On this account, these particles find application in the preparation of proton conductive materials, in particular materials intended to be used to form proton conducting membranes for fuel cells such as cells operating with $H_2$/air or $H_2/O_2$ (known under the abbreviation PEMFC for Proton Exchange Membrane Fuel Cell) or operating with methanol/air (known under the abbreviation DMFC standing for Direct Methanol Fuel Cell).

Therefore the technical field of the invention can generally be defined as that of materials able to be used to form electrolytes for fuel cells.

STATE OF THE PRIOR ART

A fuel cell is an electrochemical generator which converts the chemical energy of an oxidation reaction of a fuel in the presence of an oxidizer into electric energy.

In general, a fuel cell comprises a plurality of electrochemical cells mounted in series, each cell comprising two electrodes of opposite polarity separated by a proton exchange membrane acting as solid electrolyte.

The membrane ensures the passing of protons to the cathode after the formation thereof during oxidation of the fuel at the anode.

Membranes structure the core of the fuel cell and must therefore perform well in terms of proton conduction and must have low permeability to reactant gases ($H_2$/air or $H_2/O_2$ for PEMFC cells and methanol/air for DMFC cells). The properties of the constituent materials of the membranes are essentially heat stability, resistance to hydrolysis and oxidation and a certain degree of mechanical flexibility.

Some membranes routinely used and meeting these requirements are membranes obtained from polymers formed of a main perfluorinated straight chain and side chains carrying sulfonic acid groups. Amongst the most known, mention can be made of membranes marketed under the trade name NAFION® by Dupont de Nemours or under the trade name DOW®, FLEMION® or Aciplex® by Dow Chemicals and Asahi Glass. These membranes display good electrochemical performance and a lifetime of interest but nonetheless insufficient for PEMFC applications. In addition, their cost remains prohibitive for marketing. For DMFC applications they have high methanol permeability which also restricts the use thereof with this type of fuel. Finally, these membranes have major sensitivity to temperatures higher than 80° C. which excludes their use in cells operating at high temperatures, namely at between 80° C. and 150° C.

For DMFC applications, they have high methanol permeability which also restricts their use with this type of fuel. Additionally, their constituent monomers have a structure of hydrophilic/hydrophobic type making them particularly sensitive to phenomena of hydration and dehydration. Their operating temperature therefore typically lies in the region of 80° C. since beyond this point hydration instabilities cause early ageing of the membranes.

There is therefore a real need to stabilise the proton conduction of these membranes at around 100° C. To do so, some authors have turned towards the development of more complex membranes which, in addition to a conductive organic polymer matrix, comprise compounds or particles able to contribute additional conductivity. If the particles are mineral particles, these membranes are designated by the term "hybrid inorganic-organic membranes".

For example, patents US 2005/0227135 and US 2005/0244697 describe the adding of hydrophilic inorganic compounds to improve the hydration level of membranes at high temperature (the inorganic compounds being agglomerates of metal oxide or metal phosphate particles for US 2005/0227135 or clay-containing cation exchange materials for US 2005/0244697).

Nevertheless, even if these formulations of composite membranes improve the proton conductivity of membranes in the region of 100° C., they remain insufficient to meet the operating criteria of a fuel cell at these temperatures.

One alternative to hybrid inorganic-organic membranes may consist of directly grafting organic compounds onto inorganic particles, these compounds carrying proton exchange groups as described in WO 2005/101552, US 2005/0175880, whereby the proton exchange groups are sulfonic acid groups, the membranes prepared from such particles being able to operate at temperatures higher than 80° C. but limited to 95° C. To operate at temperatures higher than 95° C., one solution may consist, on the surface of inorganic particles, of grafting organic compounds such as chains of poly(vinyl phosphonic acid) carrying phosphonic acid groups, this grafting possibly consisting of polymerising the corresponding monomers (e.g. vinylphosphonic acid or diethyl vinylphosphonate) on inorganic particles, with the disadvantage that this anionic polymerisation step requires the use of butyllithium as polymerisation initiator under very strict temperature conditions (namely about −78° C.).

In the light of existing methods, the authors of this invention have set out to develop a solution to replace the grafting of inorganic particles as in the prior art, which does not necessitate drastic preparation conditions notably in terms of temperature so that it is possible impart the invention with a character that is easily transposable onto an industrial scale and provides access to ion conduction properties that can be modulated.

For this purpose, the authors hereof have designed novel copolymers intended to be grafted onto the surface of inorganic particles, these copolymers and these grafted particles also being prepared following novel preparation methods.

DISCLOSURE OF THE INVENTION

The invention relates to a copolymer comprising a chain of siloxane repeat units of at least two different types, a first type of siloxane repeat unit comprising at least one —OH group on the silicon atom of the siloxane repeat unit, and a second type of repeat unit comprising at least one pendant chain on the silicon atom of the said repeat unit, this pendant chain consisting of a polymer chain having a chain of repeat units carrying at least one group of formula —PO$_3$R$^1$R$^2$ where R$^1$ and R$^2$ independently of each other represent a hydrogen atom, an alkyl group e.g. an alkyl group having 1 to 4 carbon atoms (e.g. a methyl group, ethyl group or isopropyl group) or a cation (such as an alkaline cation, ammonium cation).

By siloxane repeat unit is meant a repeat unit comprising a —Si—O— group, the silicon atom being linked in addition to an oxygen atom of the same unit and to another oxygen atom of the adjacent unit, to two other groups.

As mentioned above, the copolymers of the invention, in their chain, comprise at least two types of siloxane repeat units, including a first type consisting of a siloxane repeat unit comprising at least one —OH group directly linked to the silicon atom of said repeat unit, and a second type consisting of a siloxane repeat unit comprising at least one pendant chain directly linked to the silicon atom of said repeat unit, the said pendant chain consisting of a polymer chain comprising a chain of repeat units carrying at least one —PO$_3$R$^1$R$^2$ group, R$^1$ and R$^2$ being such as defined above.

Siloxane repeat units of the first aforementioned type may meet following formula (I):

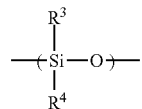

(I)

where one of R$^3$ and R$^4$ represents an —OH group, whilst the other group represents an alkyl group, for example an alkyl group having 1 to 20 carbon atoms such as a methyl group.

More specifically, a repeat unit conforming to the definition given above may be a repeat unit of following formula (II):

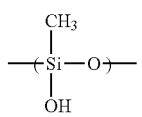

(II)

Repeat units of the second aforementioned type may meet following formula (III):

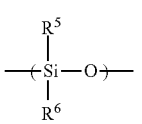

(III)

where one of R$^5$ and R$^6$ represents a polymer chain comprising a chain of at least one repeat unit carrying at least one —PO$_3$R$^1$R$^2$ group, R$^1$ and R$^2$ being such as defined above, whilst the other group represents an alkyl group, e.g. an alkyl group having 1 to 20 carbon atoms such as a methyl group.

In particular, R$^6$ may represent a polymer chain comprising a chain of repeat units derived from the polymerisation of at least one vinyl monomer (namely a monomer carrying at least one double carbon-carbon bond) carrying a —PO$_3$R$^1$R$^2$ group with R$^1$ and R$^2$ being such as defined above.

Among the vinyl monomers that are suitable, mention can be made of the monomers having following formula (IV):

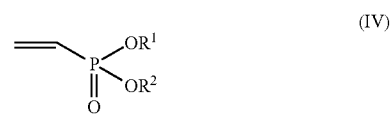

(IV)

with R$^1$ and R$^2$ being such as defined above, in which case the repeat unit derived from the polymerisation of said monomers meets following formula (V):

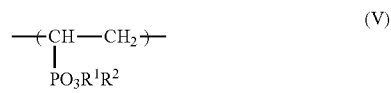

(V)

R$^1$ and R$^2$ being such as defined above.

Specific monomers conforming to this definition may be esters of vinylphosphonic acid such as diethyl vinylphosphonate or dimethyl vinylphosphonate.

Among other vinyl monomers which may be suitable mention can be made of the monomers of following formula (VI):

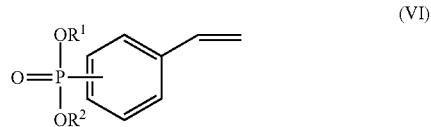

(VI)

with R$^1$ and R$^2$ being such as defined above, the —PO$_3$R$^1$R$^2$ group possibly being at meta, para or ortho position relative to the —CH=CH$_2$ group, in which case the repeat unit derived from the polymerisation of said monomers meets following formula (VII):

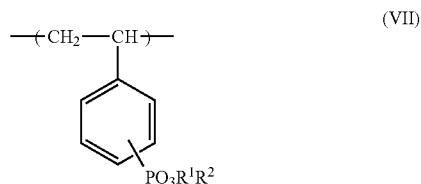

(VII)

Some specific monomers conforming to this definition may be 4-vinylbenzenephosphonic acid or 3-vinylbenzenephosphonic acid.

Finally, among other vinyl monomers which are suitable mention can be made of the monomers having the following formula:

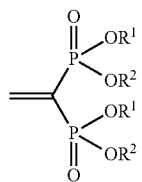

where $R^1$ and $R^2$ are such as defined above. One specific example of this type of monomer is diisopropyl vinylphosphonate.

In addition to the siloxane repeat units of the first type and second type mentioned above, the copolymers of the invention may include siloxane repeat units of a third type able to meet following formula (VIII):

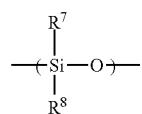

(VIII)

where $R^7$ and $R^8$ represent an alkyl group e.g. an alkyl group having 1 to 20 carbon atoms such as a methyl group.

From a structural viewpoint, the copolymers of the invention may be block copolymers.

One specific block copolymer conforming to the invention may meet following general formula (IX):

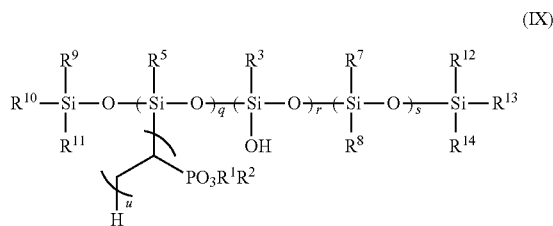

(IX)

where:

$R^1$, $R^2$, $R^3$, $R^5$, $R^7$ and $R^8$ meet the same definitions as those given above;

$R^9$, $R^{10}$, $R^{11}$, $R^{12}$, $R^{13}$ and $R^{14}$ independently of each other represent an alkyl group e.g. an alkyl group having 1 to 20 carbon atoms such as a methyl group;

q, r, s and u represent the number of repeats of the unit between brackets, q, r and u being higher than 1 and s being equal to or higher than 0.

One particular copolymer meeting the definition given above is a copolymer meeting following formula (X):

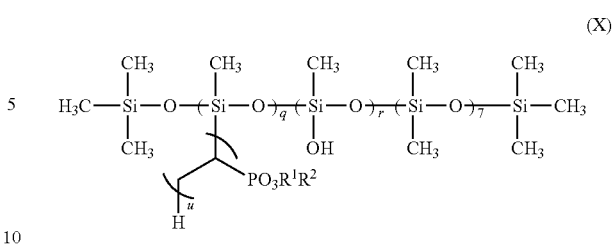

(X)

where:

q and r correspond to the number of repeats of the unit between brackets and the sum (q+r) equals 8;

u corresponds to the number of repeats of the unit between brackets and is higher than 1;

$R^1$ and $R^2$ are such as defined above.

The copolymers of the invention may comprise at least 0.1 mole % of the first type of repeat unit e.g. from 0.1 to 99.9 mole %; at least 0.1 mole % of the second type of repeat unit e.g. from 0.1 to 99.9 mole %, and optionally from 0 to 99.8 mole % of the third type of repeat unit.

The molar mass of the copolymers of the invention may range from 104 to 300000 g·mol$^{-1}$.

The copolymers of the invention can be prepared following a preparation method comprising a reaction step, in the presence of water and at least one organic solvent, to react a base (co)polymer of polysiloxane type comprising a chain of repeat units including a first siloxane repeat unit having at least one hydrogen atom on the silicon atom of the said unit, in the presence of a Lewis acid of borane type, with a vinyl monomer (namely, a vinyl monomer carrying at least one double carbon-carbon bond) carrying a —PO$_3$R$^1$R$^2$ group, R$^1$ and R$^2$ being such as defined above, after which a copolymer is formed comprising a chain of at least two types of siloxane repeat units, including a first type consisting of a siloxane repeat unit having at least one —OH group directly linked to the silicon atom of said unit, and a second type consisting of a siloxane repeat unit comprising at least one pendant chain directly linked to the silicon atom of the said unit, the said pendant chain consisting of a polymer chain comprising a chain of repeat units carrying at least one —PO$_3$R$^1$R$^2$ group, R$^1$ and R$^2$ being such as defined above.

Without being bound by any theory, the method for preparing the copolymers of the invention could be explained by the following mechanisms:

the Lewis acid of borane type, if symbolised by the formula BX$_3$, and when in contact with the base (co)polymer at the Si—H groups, forms an intermediate complex —Si$^{\delta+}$—$^{\delta-}$HBX$_3$;

the water in the medium reacts with part of the groups in the form of a —Si$^{\delta-}$—$^{\delta-}$HBX$_3$ complex to form dihydrogen and release the Lewis acid BX$_3$ of borane type, leaving —Si—OH groups to subsist on the base copolymer, which in other words means that part of the —Si—H groups initially present on the base copolymer is converted to —Si—OH groups;

the other part of the groups in the form of a —Si$^{\delta-}$—$^{\delta-}$HBX$_3$ complex which did not react with the water is used as starting point for anionic polymerisation of the above-mentioned vinyl monomers, after which polymer chains are formed linked to the silicon atom, the said polymer chains comprising a chain of repeat units derived from the polymerisation of said vinyl monomers.

As mentioned above the base (co)polymer of polysiloxane type comprises a chain of repeat units including a first siloxane repeat unit having at least one hydrogen atom on the silicon atom of said unit, this first repeat unit able to meet the following general formula (XI):

(XI)

where $R^{15}$ is a hydrogen atom or an alkyl group.

In addition to these repeat units, this base (co)polymer may comprise other repeat units such as a repeat unit for example of following formula (XII):

(XII)

where $R^7$ and $R^8$ represent an alkyl group e.g. an alkyl group having 1 to 20 carbon atoms, such as a methyl group.

One specific base copolymer conforming to the invention may meet the following general formula (XIII):

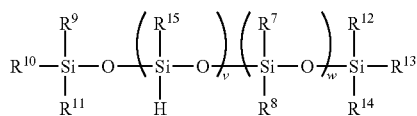

where:
$R^9$, $R^{10}$, $R^{11}$, $R^{12}$, $R^{13}$, $R^{14}$, $R^{15}$, $R^7$ and $R^8$ are such as defined above; and
v and w represent the number of repeats of the unit between brackets.

One particular base copolymer meeting the definition given above is a copolymer meeting the following formula (XIV):

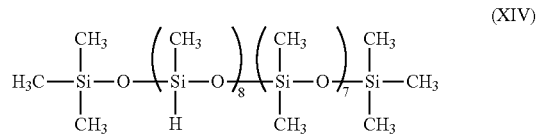
(XIV)

The reaction step between a base (co)polymer and the vinyl monomers is conducted in the presence of a Lewis acid of borane type, this Lewis acid possibly being a Lewis acid belonging to the triarylborane family, optionally perfluorinated, such as tris(pentafluorophenyl)borane for example.

The reaction step, in addition to the presence of water, is conducted in the presence of an aprotic organic solvent such as an aromatic solvent e.g. toluene, and at a temperature possibly ranging from 0 to 100° C. for a time possibly ranging from 1 minute to 24 hours.

According to one particular embodiment of the invention, if it is desired in particular to control the amount of Si—OH group in the copolymer conforming to the invention, this may entail controlling the quantity of water present in the reaction medium in which the above-mentioned reaction is to be performed.

To do so, before contacting the base (co)polymer with the reaction medium, the addition can be made to the reaction medium containing an organic solvent, water and Lewis acid of borane type, of a monosilane compound in a predetermined quantity which may range from 5 to 50 mole % relative to the number of moles of the repeat unit carrying the Si—H group, preferably from 20 to 35 mole %.

This monosilane compound may be pentamethylsiloxane for example.

Without being bound by any theory, the monosilane compound forms a complex with the Lewis acid of borane type which will react with part of the water present in the medium, after which dihydrogen and a monosilanol are formed (derived from the monosilane compound) which remain inert at the above-mentioned reaction step. The consumption of water in the medium must not be complete so as to leave a specific amount of water able to generate the silanol functions on the base (co)polymer, subsequent advantage able to taken from these silanol functions to graft inorganic particles.

As an example, we propose the following reaction scheme with specific reagents:

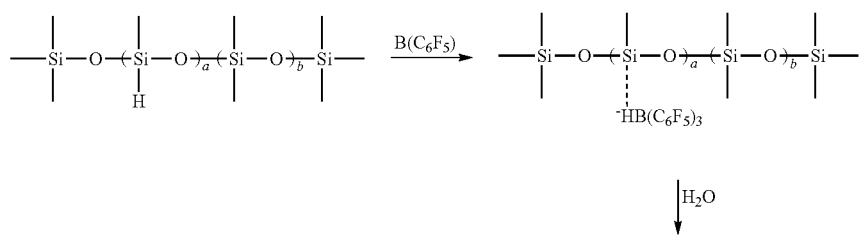

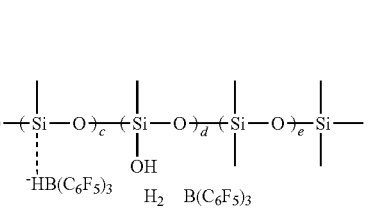
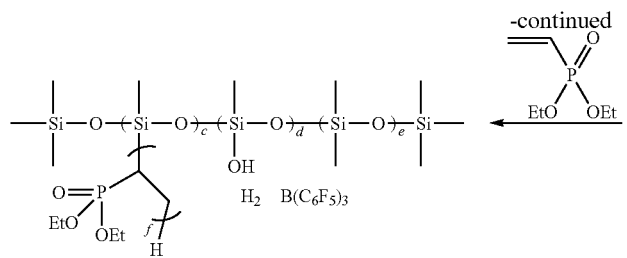

Et corresponds to the ethyl group, a, b, c, d, e, and f corresponding to the number of repeats of the unit between brackets.

The copolymers of the invention, as mentioned above, are advantageously intended to be grafted onto inorganic particles so as to provide these particles with a functionality related to the characteristics of the copolymer, in particular characteristics of proton conduction related to the presence of the —$PO_3R^1R^2$ groups.

The invention therefore relates to inorganic particles grafted by at least one copolymer such as defined above via at least one —Si—OH group of the said copolymer to form an —Si—O— binding group between said copolymer and said particles.

It is specified that by grafting is conventionally meant the immobilisation of the copolymers on the surface of the particles via covalent bonds between said copolymers and said particles, these covalent bonds resulting from the formation of —Si—O— bridge-forming groups between the copolymers and particles.

Through the grafting of copolymers conforming to the invention and when the —$PO_3R^1R^2$ groups are capable of exchanging protons (which is the case if $R^1$ and $R^2$ are hydrogen atoms or cations), it is possible to obtain a significant increase in ion exchange capacity which is directly related to the number of proton exchange acid groups present in the polymer chain. It is therefore possible to envisage the use of these particles as charges in materials not having proton conduction properties. In addition, it will be possible to adjust the proton conduction level of materials incorporating the same, by controlling the number of repeat units comprising proton exchange acid groups present in the copolymers grafted on the surface of the particles.

The inorganic particles may be particles of zeolite, zirconium phosphates or phosphonates, clays, oxides such as particles of silica, alumina, zirconia, titanium oxide, grafted by copolymers such as defined above.

In particular, the inorganic particles may be particles of oxides such as particles of silica grafted by copolymers such as defined above.

These particles, before grafting, comprise groups capable of reacting with the —Si—OH functions present in the copolymer to form a —Si—O— bridge-forming group, these groups capable of reacting possibly being —OH groups which is conventionally the case with oxide particles such as silica particles.

The grafted inorganic particles conforming to the invention can be prepared following a preparation method comprising a step to contact a copolymer of the invention with inorganic particles comprising at least one group capable of reacting with the —Si—OH groups present at the said copolymer to form a —Si—O— bridge-forming group, after which the said grafted particles are formed.

The contacting step can be performed by contacting the copolymer in an organic solution (e.g. in an aprotic organic solvent such as toluene) with inorganic particles previously dispersed in an aprotic organic solvent (e.g. toluene), the resulting mixture possibly being heated under reflux temperature of the reaction mixture for an efficient time to obtain grafting of the copolymers onto the inorganic particles.

The method, after grafting and if needed, may comprise a hydrolysis step of the —$PO_3R^1R^2$ groups (if $R^1$ and $R^2$ represent an alkyl group) to make them proton conductive which is the case if $R^1$ and $R^2$ represent a hydrogen atom or a cation.

After the reaction between the copolymers of the invention and the inorganic particles, and the optional hydrolysis step, the particles obtained can be subjected to one or more washing steps e.g. by centrifuging to remove those copolymers which did not react with the particles, Lewis acid of borane type and when applicable the monosilane compound and possible oligomers formed therefrom.

As an example, the grafting reaction of the inorganic particles with copolymers of the invention can be illustrated with specific reagents by the following reaction scheme:

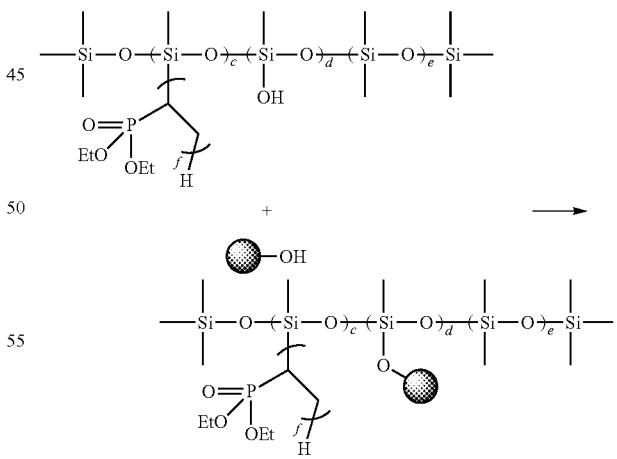

the solid sphere corresponding to an inorganic particle of which only one pendant —OH group is illustrated, Et corresponds to the ethyl group, c, d, e and f corresponding to the number of repeats of the repeat unit between brackets.

The particles of the invention, as indicated above, may be proton conductive through the nature of the copolymers grafted onto their surface, this proton conduction able to be adjusted by acting on the number of repeat units carrying at least one proton exchange group.

These particles therefore naturally find application in the field of proton conducting materials such as fuel cell membranes.

The invention therefore also relates to a proton conducting material comprising particles such as defined above and optionally a polymer matrix in which said particles are dispersed.

According to a first alternative, the polymer matrix may be a matrix of polymer(s) that are non-proton conductive in which case the particles will provide proton conducting properties to the material.

Said polymers may be fluorinated polymers such as polytetrafluoroethylene (PTFE), a polyvinylidene fluoride (PVDF), an ethylene tetrafluoroethylene copolymer (ETFE) and the derivatives thereof. The fluorinated polymers have the particular advantage of exhibiting good mechanical strength and good chemical resistance.

Said polymers may also be aromatic or heterocyclic polymers. It is specified that by aromatic or heterocyclic polymers is meant a polymer whose main chain comprises a chain of aromatic repeat units (e.g. phenylene) or heterocyclic repeat units (e.g. benzimidazole). Among these polymers mention can be of polysulfones, polyaryletherketones, polyimides, polybenzimidazoles, phenylene polyoxides, polycarbonates. Said polymers have the particular aspect of imparting rigidity and high chemical and heat resistance to the composite material in which they are integrated, without requiring the incorporation into the composite material of a reinforcement or filler.

In this case, the electrochemical properties contributed solely by the grafted inorganic particles are directly dependent upon the quality of their dispersion in the matrix.

According to a second alternative, the polymer matrix may be a matrix of proton conducting polymer(s).

Such polymers may be perfluorinated sulfonated polymers. It is specified that by perfluorinated sulfonated polymers it is meant polymers comprising a main perfluorinated straight chain and side chains carrying sulfonic acid groups. Said polymers are commercially available in particular under the trade name NAFION® registered by Dupont de Nemours, or ACIPLEX-S® by Asahi Chemical.

Proton conducting polymers may also be aromatic or heterocyclic polymers carrying acid functions chosen from among —$SO_3H$, —$PO_3H_2$ and —$CO_2H$. Said polymers may be polysulfones, polyaryletherketones, polyimides, polybenzimidazoles, phenylene polyoxides or polycarbonates.

The material of the invention is advantageously in the form of a film having a thickness of 20 to 200 μm for example.

The materials of the invention, when in film form, can be prepared using a so-called evaporative casting method which entails the following steps:
  a step to deposit on a substrate a mixture comprising the said particles of the invention and an organic solvent and optionally one or more polymers intended to form a polymer matrix; and
  an evaporation step of said organic solvent.

If not already carried out during the formation of the grafted particles, after the evaporation step, a hydrolysis step can be performed of the —$PO_3R^1R^2$ groups (when $R^1$ and $R^2$ represent an alkyl group) to make them proton-conductive, which is the case if $R^1$ and $R^2$ represent a hydrogen atom or a cation.

The substrate may be in glass, alumina for example or even in polyethylene. On completion of this so-called evaporative casting method, a material is obtained in the form of a film deposited on the substrate. The film obtained can easily be detached from the substrate to give a self-supporting proton conducting film.

It is specified that the solvents which may be used in this method can be chosen from among aprotic polar solvents such has N-methyl-2-pyrrolidinone, dimethylformamide, dimethylacetamide, tetrahydrofuran, dimethylsiloxane, or chlorinated solvents such as chloroform but also solvents such as alcohols, ethers, acetone.

On account of their mechanical properties, these materials can be given efficient use to provide thin films sufficiently strong for use as fuel cell membranes.

One subject of the invention is therefore a membrane for fuel cell, comprising particles such as defined above.

These membranes are advantageously in the form of thin films having a thickness ranging from 20 to 200 μm for example.

These membranes advantageously exhibit sufficient tightness to reactant gases (such as $H_2$ and $O_2$) and are stable preferably up to a temperature of at least 150° C.

The membranes such as defined above can advantageously be incorporated in fuel cell devices.

Therefore the also relates to a device comprising at least one electrode-membrane-electrode assembly in which the membrane is such as defined above and is arranged between two electrodes.

The fuel cell device generally comprises several electrode-membrane-electrode assemblies.

To prepare a said assembly the membrane can be placed between two electrodes, for example in fabric or carbon paper impregnated with a catalyst. The assembly formed of the membrane arranged between the two electrodes is then pressed at an adequate temperature to obtain good electrode-membrane adhesion.

The electrode-membrane-electrode assembly is then placed between two plates ensuring electric conduction and a supply of reagents to the electrodes. These plates are commonly called bipolar plates.

The invention will now be described with reference to the following examples given by way of illustration and non-limiting.

DETAILED DESCRIPTION OF PARTICULAR EMBODIMENTS

Figure 1:
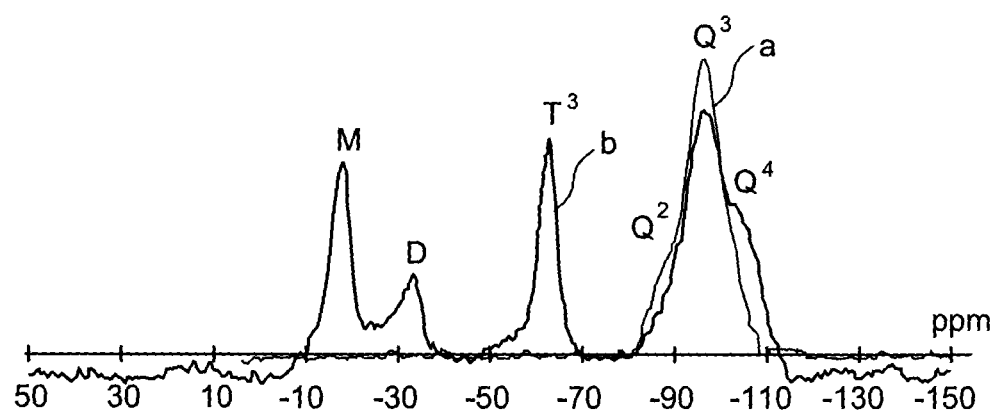
FIG. 1 illustrates a $^{29}Si$ NMR spectrum of silica particles before grafting (curve a) and after grafting (curve b) obtained according to Example 4.

In the following examples, the following reagents were used:
diethyl vinylphosphonate (symbolised by the abbreviation DEVP) and toluene supplied by Aldrich;
pentadimethylsiloxane, poly(hydromethyl-co-dimethyl) siloxane (symbolised by the abbreviation PHM-co-DMS) and tris (pentafluorophenyl)borane supplied by ABCR.

The toluene was dried for 24 hours under calcium hydride and then distilled.

The polymerisation steps were performed in mL Schlenk tubes in an inert argon atmosphere, fitted with a magnetic stirrer and a septum. Three vacuum/argon cycles were performed before adding the reagents.

Example 1

This example relates to the preparation of a polymer conforming to the invention resulting from the polymerisation of diethyl vinylphosphonate having the following formula:

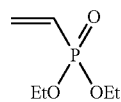

from a base copolymer: poly(hydromethyl-co-dimethyl)siloxane having the following formula:

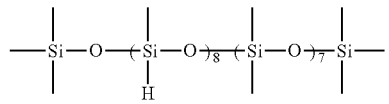

Diethyl vinylphosphonate (0.704 g; $4.3\times10^{-3}$ mol) is added to the tube. In parallel, tris (pentafluorophenyl)borane (210 mg; $4.3\times10^{-4}$ mol) is solubilised in toluene. The solution is then added to the tube. Next, pentadimethylsiloxane (0.190 g; $1.28\times10^{-3}$ mol) is added. The temperature is then set at 50° C. About 15 minutes after adding the pentadimethylsiloxane, a strong release of gas is observed which starts to fade about 30 minutes later. Poly(hydromethyl-co-dimethyl)siloxane (1 g; $2.13\times10^{-3}$ mol) is added at this precise moment. The reaction takes place for 16 hours at 85° C. On completion of the reaction, the reaction mixture is stored.

Example 2

This example relates to the preparation of a polymer conforming to the invention resulting from the polymerisation of diethyl vinylphosphonate having the following formula:

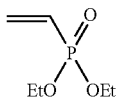

from a base copolymer: poly(hydromethyl-co-dimethyl)siloxane of following formula:

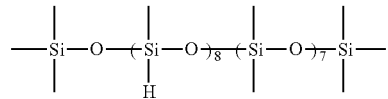

Diethyl vinylphosphonate (0.704 g; $4.3\times10^{-3}$ mol) is added to the tube. In parallel, tris(pentafluorophenyl)borane (210 mg; $4.3\times10^{-4}$ mol) is solubilised in toluene. The solution is then added to the tube. Next, pentadimethylsiloxane (0.190 g; $1.28\times10^{-3}$ mol) is added. The temperature is then set at 50° C. About 15 minutes after adding the pentadimethylsiloxane, a strong gas release is observed which starts to fade about 30 minutes later. The poly(hydromethyl-co-dimethyl)siloxane (2 g; $4.26\times10^{-3}$ mol) is added at this precise moment. The reaction takes place for 16 hours at 85° C. On completion of the reaction, the reaction mixture is stored.

Example 3

This example relates to the preparation of a polymer conforming to the invention resulting from the polymerisation of diethyl vinylphosphonate having the following formula:

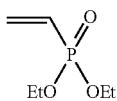

from a base copolymer: poly(hydromethyl-co-dimethyl)siloxane having the following formula:

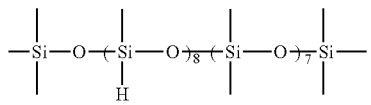

The diethyl vinylphosphonate (0.704 g; $4.3\times10^{-3}$ mol) is added to the tube. In parallel tris (pentafluorophenyl)borane (210 mg; $4.3\times10^{-4}$ mol) is solubilised in toluene. The solution is then added to the tube. Next, pentadimethylsiloxane (0.190 g; $1.28\times10^{-3}$ mol) is added. The temperature is then set at 50° C. About 15 minutes after adding the pentadimethylsiloxane, a strong gas release is observed which starts to fade about 30 minutes alter. The poly(hydromethyl-co-dimethyl)siloxane (4 g; $4.56\times10^{-3}$ mol) is added at this precise moment. The reaction takes place for 16 hours at 85° C. On completion of the reaction, the reaction medium is stored.

Example 4

This example illustrates the preparation of silica particles grafted by the copolymers prepared according to examples 1 and 3 described above.

For this purpose, a suspension of 2 g of silica nanoparticles (previously dried at 130° C. for 24 hours under nitrogen) in 120 mL of toluene is prepared in a three-necked flask under mechanical and ultrasound agitation. The suspension is placed under reflux in an oil bath for 1 hour under agitation. The reaction mixture obtained on completion of the reaction of the DEVP on PHM-co-DMS conforming to Examples 1 to 3 is added and the reflux is maintained for 16 additional hours. The functionalised silica nanoparticles are collected and washed in toluene (twice) using centrifuging cycles to remove the polymer which has not reacted. The sample obtained (3.3 g) is dried at 90° C. for 24 hours in vacuo.

The particles obtained after the different experiments were characterized by solid-state $^{29}$Si CP/MAS NMR. The spectra obtained with the copolymers resulting from Examples 1 to 3 do not exhibit any significant differences.

The spectra obtained are illustrated in FIG. 1, spectrum (a) corresponding to the spectrum obtained with the silica particles before any modification, and spectrum (b) corresponding to the spectrum obtained with the silica particles after the grafting reaction.

The particles obtained after grafting can be illustrated by the following formula:

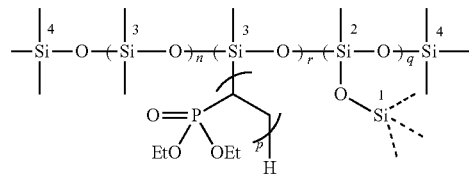

n, r, q and p representing the number of repeats of the repeat units between brackets, Et corresponding to an ethyl group, the silicon atom linked to three bonds shown as dotted lines corresponding to a silicon atom belonging to a silica particle.

In comparison with spectrum (a), on spectrum (b) the disappearance is observed of the signal corresponding to the silicon atoms of type $Q^2$ occurring at around −85 ppm combined with the occurrence of a signal of type $Q^4$ at around −105 ppm. The $Q^4$ silicon atoms correspond to those on the surface of the silica particles bound to the phosphonated copolymer i.e. those indicated by the FIG. 1 in the above formula. A resonance signal occurs at around −65 ppm corresponding to the silicon atoms of type $T^3$ (these being indicated by the FIG. 2 in the above formula), a signal characteristic of the silicon atoms bound to 3 oxygen atoms. The signal occurring a −35 ppm corresponds to the silicon atoms of type D (these being indicated by the FIG. 3 in the above formula), a signal characteristic of the silicon atoms bound to two oxygen atoms. Finally, the signal which is observed at around −15 ppm corresponds to the silicon atoms of type M (these being indicated by the FIG. 4 in the above formula), a signal characteristic of the silicon atoms bound to one oxygen atom.

The particles derived from the different experiments were characterized by solid-state $^{13}$C CP/MAS NMR. The spectra obtained with the copolymers obtained according to Examples 1 to 3 do not exhibit any significant differences.

Figure 2:
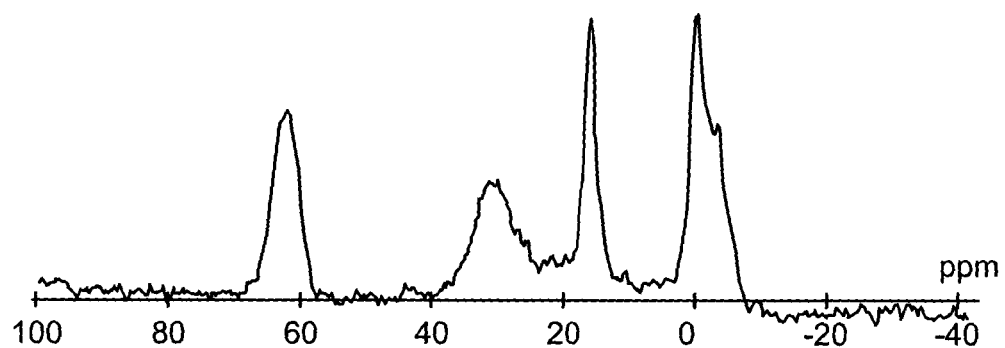
FIG. 2 illustrates a $^{13}C$ NMR spectrum of silica particles obtained after grafting according to Example 4.

The spectra obtained are illustrated in FIG. 2.

The formula given above is that of the particles obtained after grafting with specific numbering of the carbon atoms:

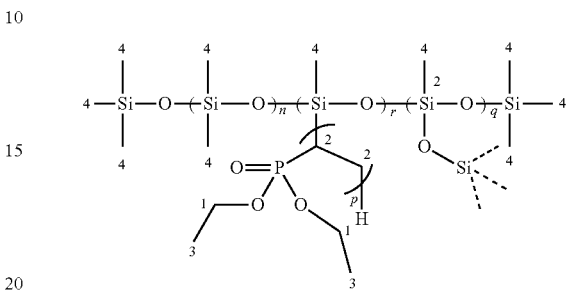

n, r, q and p representing the number of repeats of the repeat units between brackets, the silicon atom bound to three bonds shown as dotted lines corresponding to a silicon atom belonging to a silica particle.

A resonance signal at 62 ppm corresponding to the carbon atoms numbered 1 is observed. The signal at 36 pppm corresponds to carbon atoms numbered 2 of the aliphatic chain. The signal which occurs at 18 ppm corresponds to the carbon atoms numbered 3. Finally, the signal at 0 ppm corresponds to the carbon atoms numbered 4, a signal characteristic of carbon atoms belonging to a siloxane sequence. This spectrum therefore evidences grafting of the silica particles by the copolymers in Examples 1 to 3.

The particles derived from the different experiments were characterized by solid-state $^{31}$P CP/MAS NMR. The spectra obtained with the copolymers obtained according to Examples 1 to 3 do not exhibit any significant differences.

Figure 3:
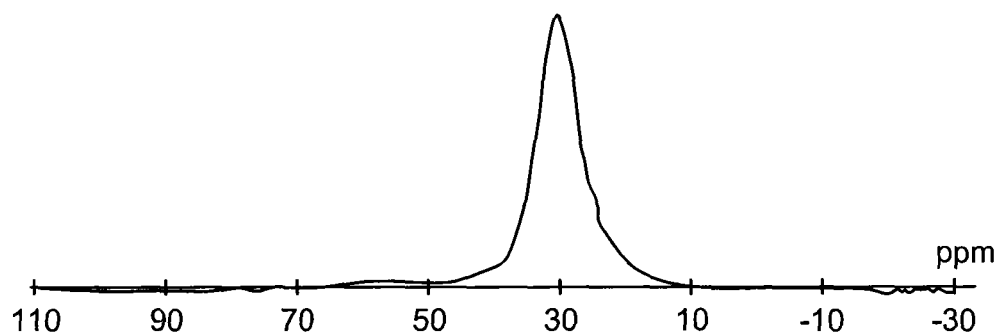
FIG. 3 illustrates a $^{31}P$ NMR spectrum of silica particles obtained after grafting according to Example 4.

The spectrum obtained is illustrated in FIG. 3.

A broad resonance signal is observed in this spectrum centred at 30 ppm, characteristic of diethyl phosphonate groups.

Figure 4:
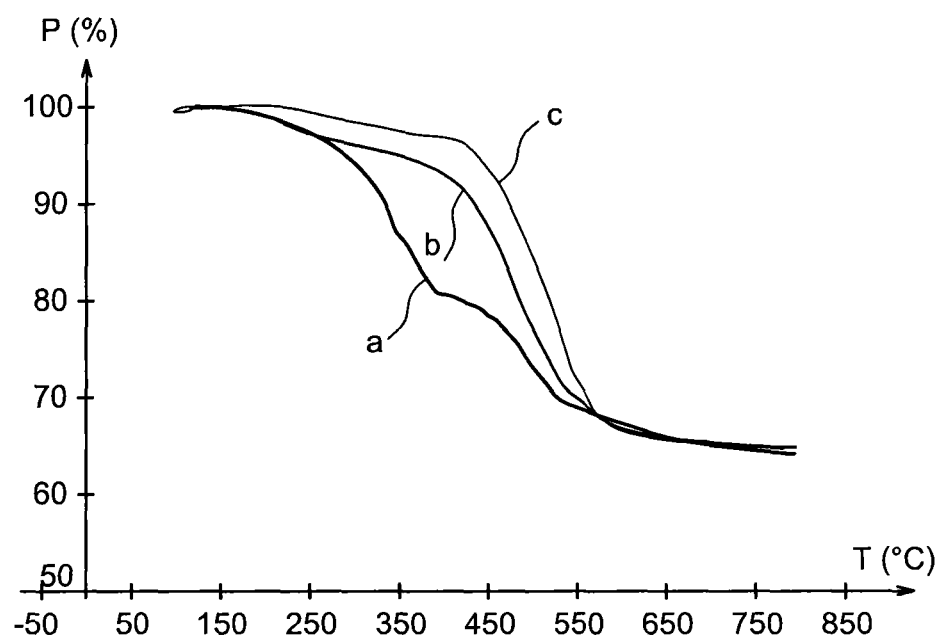
FIG. 4 gives a thermogram illustrating the trend in weight loss P (%) as a function of temperature T (° C.) (curves a, b, c respectively for the particles grafted with the copolymer of Example 1, the copolymer of Example 2 and the copolymer of Example 3).

The isolated particles were also characterized by TGA, the results being given in FIG. 4 in graph form showing the trend in weight loss P (%) as a function of temperature T (° C.) (curves a, b and c respectively for the particles grafted with the copolymer of Example 1, the copolymer of Example 2 and the copolymer of Example 3). The weight fraction at 850° C. is attributable to the inorganic part formed by the silica particles as such. The remainder at 100 is attributable to the organic part grafted onto the silica particles.

For the particles obtained from the copolymers in Examples 1, 2 and 3, the organic part represents 35 weight %.

The weight loss within the zone lying between 150 and 350° C. corresponds to the departure of the ethyl functions of the phosphonate groups, these functions representing 55 weight % of the diethylvinylphosphonate repeat unit. On the basis of these data, it is possible to deduce the weight percentage of the diethylvinylphosphonate repeat units in the products obtained.

For example, for the particles obtained by grafting the copolymers of Example 1, the weight loss in the zone lying between 150 and 350° C. is evaluated at about 22%. Starting from the above-mentioned principle according to which the ethyl functions represent 55 weight % of the diethylvinylphosphonate repeat unit, the total fraction of the copolymer chains grafted onto the silica particles is then evaluated at 40 weight %. Bearing in mind that there remains 65 weight % on completion of thermogravimetric analysis, and that the contribution of this fraction derives solely from inorganic part alone (in this case the silica), the % of copolymer on each particle can be estimated at 5%. On the basis of these different fractions, the number of repeats of the diethyl vinylphosphonate repeat unit can be estimated at 60, which allows ion exchange capacity to be estimated at 2.31 meq·g$^{-1}$.

Example 5

This example illustrates the preparation of a membrane from products obtained in Example 4 using a so-called evaporative casting method of a solution of said products. The solvent used is dimethylformamide. After casting the solution onto a glass plate, the membrane is obtained after drying for 24 hours at 60° C. It is then immersed in distilled water and collected. To obtain hydrolysis of the phosphonate groups to phosphonic groups the membrane is immersed in an aqueous 12 M hydrochloric acid solution for about 70 hours. The assay of the carbon element before and after hydrolysis indicates that the conversion rate is 95%. To remove all traces of acid the membrane is washed several times in distilled water.

The invention claimed is:

1. A copolymer, comprising a chain of siloxane repeat units of at least two different types:
   a first siloxane repeat unit comprising at least one —OH group on the silicon atom of the siloxane repeat unit; and
   a second repeat unit comprising at least one pendant chain on the silicon atom of the said repeat unit, this pendant chain consisting of a polymer chain comprising a chain of repeat units, wherein each of the repeat units carry at least one group of formula —PO$_3$R$^1$R$^2$,
   wherein R$^1$ and R$^2$ independently of each other represent a hydrogen atom, an alkyl group or a cation.

2. The copolymer according to claim 1, wherein the first repeat unit is represented by formula (I):

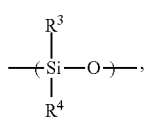

wherein one of R$^3$ and R$^4$ represents an —OH group and the other group represents an alkyl group.

3. The copolymer according to claim 1, wherein the first repeat unit is represented by formula (II):

4. The copolymer according to claim 1, wherein the second repeat unit is represented by formula (III):

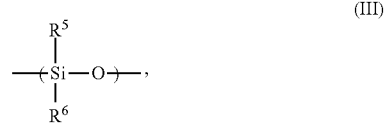

wherein one of R$^5$ and R$^6$ represents a polymer chain comprising a chain of at least one repeat unit carrying at least one of the —PO$_3$R$^1$R$^2$ group, and the other group represents an alkyl group.

5. The copolymer according to claim 4, wherein R$^6$ represents a polymer chain comprising a chain of repeat units derived from the polymerisation of at least one vinyl monomer carrying the —PO$_3$R$^1$R$^2$ group, R$^1$ and R$^2$ being such as defined in claim 1.

6. The copolymer according to claim 5, wherein the vinyl monomer is represented by formula (IV):

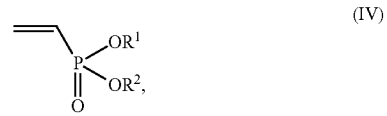

and a repeat unit derived from the polymerisation of said monomer is represented by formula (V):

7. The copolymer according to claim 5, wherein the vinyl monomer is an ester of vinylphosphonic acid.

8. The copolymer according to claim 7, wherein the ester of vinylphosphonic acid is the diethyl vinylphosphonate or the dimethyl vinylphosphonate.

9. The copolymer according to claim 1, further comprising at least one siloxane repeat unit represented by formula (VIII):

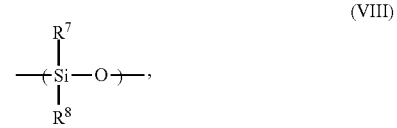

wherein R$^7$ and R$^8$ represent an alkyl group.

10. The copolymer according to claim 1, which is a block copolymer.

11. The copolymer according to claim 1, which is represented by formula (IX):

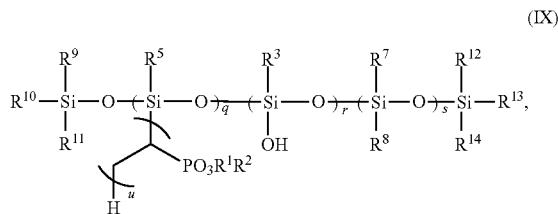
(IX)

wherein:
- $R^1$ and $R^2$ independently of each other represent a hydrogen atom, an alkyl group or a cation;
- $R^3$ represents an —OH group or an alkyl group;
- one of $R^5$ and $R^6$ represents a polymer chain comprising a chain of at least one repeat unit carrying at least one of the —PO$_3$R$^1$R$^2$ group, and the other group represents an alkyl group;
- $R^7$ and $R^8$ represent an alkyl group;
- $R^9$, $R^{10}$, $R^{11}$, $R^{12}$, $R^{13}$ and $R^{14}$ independently of each other represent an alkyl group;
- q, r, s and u represent the number of repeats of the repeat unit between brackets, with the proviso that q, r and u are higher than 1 and s is equal to or higher than 0.

12. The copolymer according to claim 1, represented by formula (X):

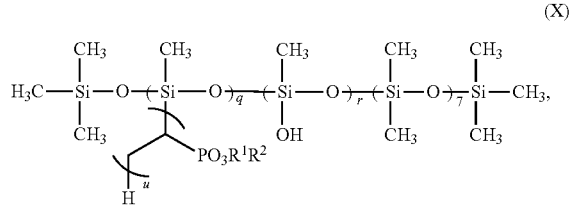
(X)

wherein
- q and r represents the number of repeats of the repeat unit between brackets and the sum (q+r) equals 8;
- u represents the number of repeats of the repeat unit between brackets and is higher than 1;
- $R^1$ and $R^2$ independently of each other represent a hydrogen atom, an alkyl group or a cation.

13. A method for preparing the copolymer of claim 1, the method comprising reacting, in the presence of water and at least one organic solvent, a base (co)polymer comprising a chain of repeat units comprising a first siloxane repeat unit having at least one hydrogen atom on the silicon atom of said repeat unit, in the presence of a Lewis acid comprising a borane, with a vinyl monomer comprising a —PO$_3$R$^1$R$^2$ group, to form a copolymer,
wherein:
- $R^1$ and $R^2$ independently of each other represent a hydrogen atom, an alkyl group or a cation; after which the copolymer comprises a chain of at least two siloxane repeat units of which a first siloxane repeat unit comprises at least one —OH group directly bound to the silicon atom of said repeat unit and of which a second siloxane repeat unit comprises at least one pendant chain directly bound to the silicon atom of the said repeat unit, the said pendant chain consisting of a polymer chain comprising a chain of repeat units, wherein each of the repeat units comprises at least one —PO$_3$R'R$^2$ group.

14. The method according to claim 13, wherein the base (co)polymer comprises a chain of repeat units comprising first siloxane represented by formula (XI):

(XI)

wherein $R^{15}$ is a hydrogen atom or an alkyl group.

15. The method according to claim 13, wherein the base (co)polymer further comprises a repeat unit of formula (XII):

(XII)

wherein $R^7$ and $R^8$ represent an alkyl group.

16. The method according to claim 13, wherein the base (co)polymer is represented by formula (XIII):

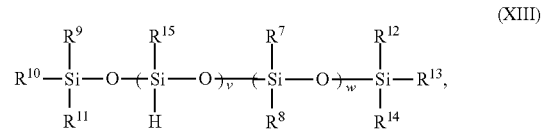
(XIII)

wherein:
- $R^7$ and $R^8$ represent an alkyl group;
- $R^9$, $R^{10}$, $R^{11}$, $R^{12}$, $R^{13}$ and $R^{14}$ independently of each other represent an alkyl group;
- $R^{15}$ is a hydrogen atom or an alkyl group; and
- v and w represent the number of repeats of the repeat unit between brackets.

17. The method according to claim 13, wherein the base (co)polymer is represented by formula (XIV):

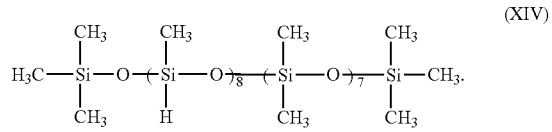
(XIV)

18. The method according to claim 13, further comprising adding a monosilane compound to a reaction medium comprising an organic solvent, water and Lewis acid comprising borane, before adding the base (co)polymer.

19. The method according to claim 13, wherein the Lewis acid is a triarylborane compound.

20. An inorganic particle grafted by at least one copolymer according to claim 1 at least one —Si—OH group of said copolymer to form a —Si—O— bonding group between said copolymer and said particle.

21. The inorganic particle according to claim 20, which is an oxide particle.

22. The inorganic particle according to claim 20, which is a silica particle.

23. A fuel cell membrane, comprising the inorganic particle of claim 20.

24. A fuel cell device, comprising at least one electrode membrane-electrode assembly comprising the membrane of claim 23.

* * * * *